(12) United States Patent
Yang

(10) Patent No.: US 10,899,399 B1
(45) Date of Patent: Jan. 26, 2021

(54) SPARE TIRE CARRIER

(71) Applicant: Paramount Restyling Automotive Inc., Ontario, CA (US)

(72) Inventor: Mingfa Yang, Ontario, CA (US)

(73) Assignee: Paramount Restyling Automotive Inc., Ontario (CA)

( * ) Notice: Subject to any disclaimer, the term of this patent is extended or adjusted under 35 U.S.C. 154(b) by 0 days.

(21) Appl. No.: 16/563,081

(22) Filed: Sep. 6, 2019

(51) Int. Cl.
*B62D 43/02* (2006.01)
(52) U.S. Cl.
CPC .................................. *B62D 43/02* (2013.01)
(58) Field of Classification Search
CPC ...... B62D 43/02; B62D 43/002; B62D 43/04; B62D 43/045; B60R 9/06
USPC ............................................... 224/42.21, 509
See application file for complete search history.

(56) References Cited

U.S. PATENT DOCUMENTS

| | | | | |
|---|---|---|---|---|
| 3,387,754 A | * | 6/1968 | Sinkey | B62D 43/02 224/42.21 |
| 5,358,157 A | * | 10/1994 | Abretske | B60R 9/06 224/42.13 |
| 5,996,869 A | * | 12/1999 | Belinky | B60R 9/06 116/28 R |
| 6,260,752 B1 | * | 7/2001 | Dollesin | B60R 9/065 224/495 |
| 2004/0222261 A1 | * | 11/2004 | Wilson | B62D 43/002 224/509 |
| 2005/0023315 A1 | * | 2/2005 | Skinner | B60R 9/06 224/506 |
| 2018/0118283 A1 | * | 5/2018 | Gutierrez | B60P 7/135 |
| 2020/0114988 A1 | * | 4/2020 | Wronski | B62D 43/02 |

* cited by examiner

*Primary Examiner* — Corey N Skurdal
(74) *Attorney, Agent, or Firm* — Myers Andras LLP; Joseph C. Andras

(57) ABSTRACT

A swing-away spare tire carrier assembly and system are designed to reduce shipping costs from the manufacturer to the end user, as well between the manufacturer and distributors. A swing-away tire carrier assembly has two vertical pieces that connect the tire to the swing-away horizontal arm. The vertical pieces comprise a vertical support stub that is mounted to the swing-away horizontal arm, and a detachable center bracket that holds the tire and is bolted to the shorter vertical support stub. As the center bracket is shipped detached to the vertical support stub, the shipping container for embodiments described herein are smaller compared to shipping containers for conventional tire carriers. A reinforcing member is laced within the vertical support stub and provides for additional welding joints to be formed between the horizontal and vertical surfaces.

20 Claims, 19 Drawing Sheets

SPARE TIRE CARRIER

BACKGROUND OF THE INVENTION

1. Field of the Invention

The present invention relates in general to a spare tire carrier. In particular, the invention is directed to a swing-away spare tire carrier for a motor vehicle.

2. Description of the Related Art

Swing-away spare tire carriers are commonly mounted on the rear of motor vehicles such as on sport utility vehicles. Many spare tire carriers are often after-market products, which an end user must order and install. Shipping costs for spare tire carriers can be expensive, as the spare tire carriers are large and heavy, particularly if a new after-market bumper is also ordered with the spare tire carrier. A typical, fully-assembled spare tire carrier may have a length of approximately that of a bumper of a motor vehicle, and may have a height roughly the size of a spare tire.

Many commercial package delivery companies base their shipping costs on a combination of weight and size of shipped packages, and may often impose higher shipping rates for larger or oversized packages. These shipping costs may be considerable and may increase the overall cost of purchasing an after-market spare tire carrier dramatically. Many consumers may base their decision to buy a particular spare tire carrier based on shipping price, and may even expect that the shipping costs are paid by the seller of the spare tire carrier.

Accordingly, there is a need for a spare tire carrier that is designed to minimize shipping costs.

SUMMARY OF THE INVENTION

In the first aspect, a swing-away spare tire carrier assembly for a motor vehicle is disclosed. The swing-away spare tire carrier assembly comprises a horizontal arm having a front section and first arm end pivotally configured to be connected to a bumper of a vehicle, the horizontal arm having a second arm end having a latching mechanism, the first arm end opposite to the second arm end, and a U-shaped vertical support stub affixed to the horizontal arm, the vertical support stub having a vertical support stub back plate perpendicular to the length of the horizontal arm and two vertical support stub side plates emerging perpendicular away from the vertical support stub back plate, the vertical support stub having a plurality of stub through-holes. The swing-away spare tire carrier assembly further comprises a U-shaped center bracket, the center bracket having a center bracket back plate and a first and a second center bracket side plates emerging perpendicular away from the center bracket back plate on opposite sides of the center bracket, the U-shaped center bracket shaped to surround the vertical support stub back plate and the two vertical support stub side plates and secure to the vertical support stub with a plurality of fasteners.

In a first preferred embodiment, the U-shaped vertical support stub is welded to the horizontal arm. The swing-away spare tire carrier assembly preferably further comprises a reinforcing member attached to the vertical support stub and the horizontal arm. The vertical support stub preferably further comprises a vertical stub top plate affixed to the top of the vertical support stub back plate and the two vertical support stub side plates, and the reinforcing member is welded to the vertical stub top plate, the vertical support stub back plate, and the horizontal arm. The U-shaped vertical support stub preferably further comprises a vertical support stub bottom plate perpendicular to the vertical support stub back plate and to the two vertical support side plates, the vertical support horizontal bottom plate having a plurality of holes, the horizontal arm having a plurality of corresponding holes, wherein the vertical support stub bottom plate is configured to be bolted to the horizontal arm. The U-shaped center bracket attached to the U-shaped vertical support stub preferably forms a double wall.

The swing-away spare tire carrier assembly preferably further comprises a first and a second diagonal lateral support brackets, the first diagonal lateral support bracket is coupled to the horizontal arm and to first center bracket side plate, the second diagonal lateral support bracket is coupled to the horizontal arm and to second center bracket side plate. The swing-away tire carrier assembly is preferably an after-market product. The U-shaped vertical support stub is preferably recessed with respect to front section of the horizontal arm.

In a second aspect, a swing-away spare tire carrier assembly for a motor vehicle is disclosed. The swing-away spare tire carrier assembly comprises a horizontal arm having a front section and first arm end pivotally configured to be connected to a bumper of a vehicle, the horizontal arm having a second arm end having a latching mechanism, the first arm end opposite to the second arm end, and a U-shaped vertical support stub affixed to the horizontal arm, the vertical support stub having a vertical support stub back plate perpendicular to the length of the horizontal arm, two vertical support side plates emerging perpendicular away from the vertical support stub back plate, and a vertical support stub top plate affixed to the top of the vertical support stub back plate and the two vertical support stub side plates. The swing-away spare tire carrier assembly further comprises a U-shaped reinforcing member having two side flanges, the reinforcing member secured within the U-shaped vertical support stub with the two side flanges secured to the vertical support stub back plate, the reinforcing member extending vertically from the horizontal arm to the vertical support stub top plate, and a U-shaped center bracket, the center bracket having a center bracket back plate and a first and a second center bracket side plates emerging perpendicular away from the center bracket back plate on opposite sides of the center bracket, the U-shaped center bracket shaped to surround the vertical support stub back plate and the two vertical support stub side plates and secure to the vertical support stub with a plurality of fasteners.

In a second preferred embodiment the bottom end of vertical support stub is welded to the horizontal arm, and the reinforcing member is welded to the horizontal arm, to the vertical support back plate, and to the vertical support top plate. The U-shaped center bracket attached to the U-shaped vertical support stub preferably forms a double wall. The swing-away spare tire carrier assembly preferably further comprises a first and a second diagonal lateral support brackets, the first diagonal lateral support bracket is coupled to the horizontal arm and to first center bracket side plate, the second diagonal lateral support bracket is coupled to the horizontal arm and to second center bracket side plate. The swing-away tire carrier is preferably an after-market product. The U-shaped vertical support stub is preferably recessed with respect to front section of the horizontal arm.

In a third aspect, a swing-away spare tire carrier system for a motor vehicle is disclosed. The swing-away spare tire carrier system comprises a bumper configured to attach to a motor vehicle, the bumper having a bumper pin protruding vertically from the bumper first end of the bumper, the bumper having a latching bracket on the second end of the bumper, the first end of the bumper opposite the second end of the bumper, and a horizontal arm having a front section and first arm end pivotally configured to the bumper pin of the bumper, the horizontal arm having a second arm end having a latching mechanism, the first arm end opposite to the second arm end. The swing-away spare tire carrier system further comprises a U-shaped vertical support stub affixed to the horizontal arm, the vertical support stub having a vertical support stub back plate perpendicular to the length of the horizontal arm and two vertical support side plates emerging perpendicular away from the vertical support stub back plate, the vertical support stub having a plurality stub through-holes, and a U-shaped center bracket, the center bracket having a center bracket back plate and a first and a second center bracket side plates emerging perpendicular away from the center bracket back plate on opposite sides of the center bracket, the U-shaped center bracket shaped to surround the vertical support stub back plate and the two vertical support stub side plates and secure to the vertical support stub with a plurality of fasteners.

In a third preferred embodiment, the U-shaped vertical support stub is welded to the horizontal arm. The swing-away spare tire carrier system preferably further comprises a reinforcing member attached to the vertical support stub and the horizontal arm. The vertical support stub preferably further comprises a vertical stub top plate affixed to the top of the vertical support stub back plate and the two vertical support stub side plates, and the reinforcing member is welded to the vertical stub top plate, the vertical stub back plate, and the horizontal arm. The U-shaped vertical support stub preferably further comprises a vertical support stub bottom plate perpendicular to the vertical support stub back plate and to the two vertical support side plates, the vertical support horizontal bottom plate having a plurality of holes, the horizontal arm having a plurality of corresponding holes, wherein the stub bottom plate is configured to be bolted to the horizontal arm.

These and other features and advantages of the invention will become more apparent with a description of preferred embodiments in reference to the associated drawings.

DETAILED DESCRIPTION OF THE PREFERRED EMBODIMENTS

In one or more embodiments, a swing-away spare tire carrier assembly and system are designed to reduce shipping costs between the manufacturer and the end user, and between the manufacturer and its distributors. Shipping costs are often based on both the weight and the physical dimensions of a shipping container. Some shipping companies impose higher shipping rates for containers that are large or oversized.

Most conventional after-market spare tire carriers have swing-away arms mounted to the bumpers of vehicles with vertical members that connect the spare tires to the swing-away arms. Conventional after-market spare tire carriers may have horizontal dimension based on the lengths of the bumpers, and may have vertical dimensions based on the diameters of the spare tires. Conventional after-market spare tire carriers typically have a horizontal dimension of approximately 50 inches and a vertical dimension of approximately 24 inches. Hence, a shipping container for a conventional spare tire carrier may be approximately in excess of 50 inches by 24 inches.

In an embodiment, an after-market spare tire carrier assembly has two vertical pieces that connect the spare tire to the swing-away horizontal arm. The vertical pieces comprise a vertical support stub that is mounted to the swing-away horizontal arm, and a detachable center bracket that holds the spare tire and is bolted to the vertical support stub. The overall vertical height of the vertical support stub and the horizontal arm is approximately 10 inches, and the height of the center bracket is approximately 20 inches. As the center bracket is shipped detached from the vertical support stub, the shipping container for embodiments described herein are reduced compared to shipping containers for conventional spare tire carriers. In an embodiment, the shipping container holding a spare tire carrier assembly and a bumper has the dimensions of 50 inches length×15 inches height×8 inches width. Hence, shipping containers of embodiments described herein may have reduced vertical dimensions of 9 inches for a reduction of vertical height of approximately 37.5%.

Figure 1:
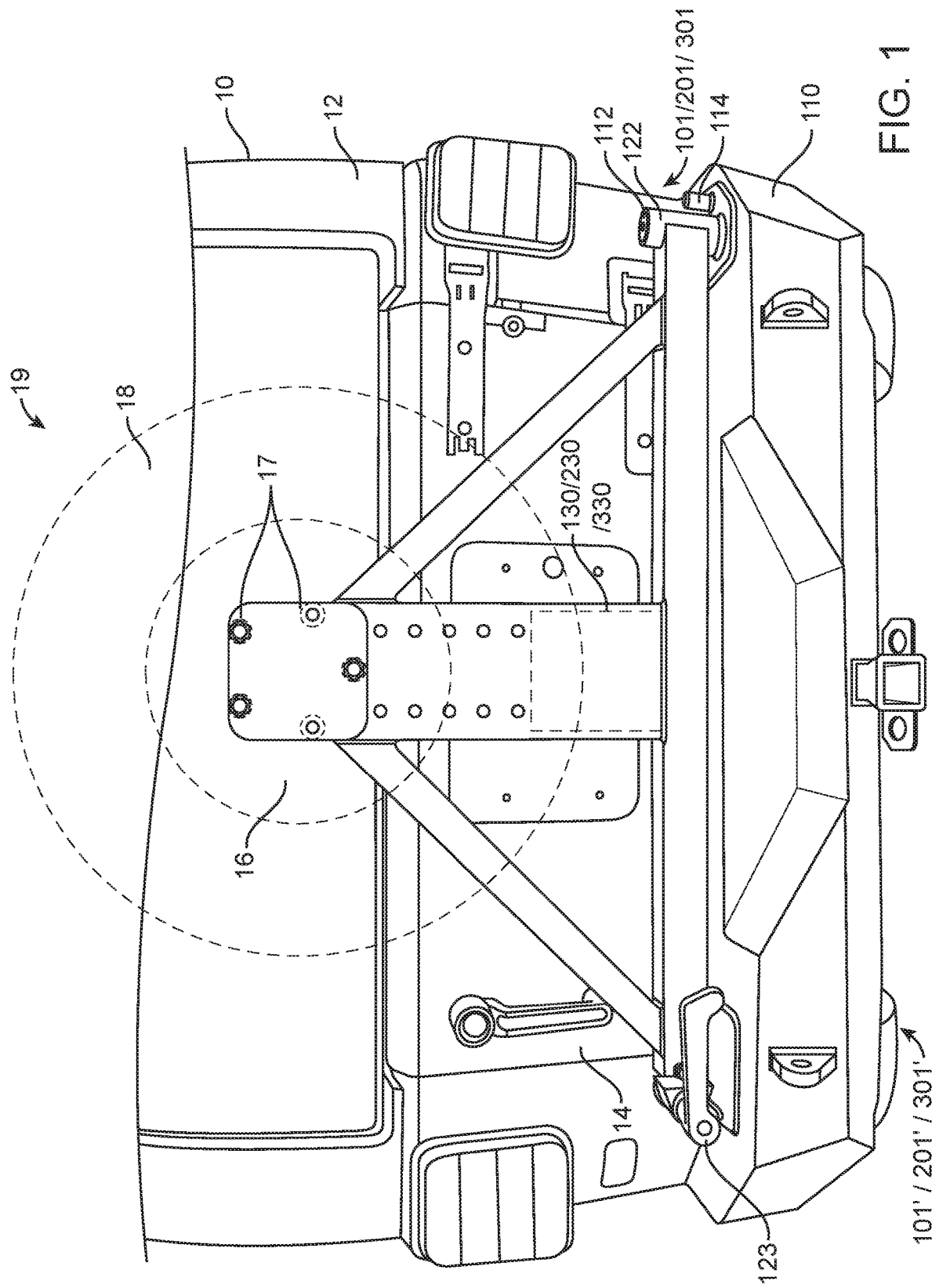
FIG. 1 is a rear view of a motor vehicle having a spare tire carrier assembly with an after-market bumper in one or more embodiments.

FIG. 1 is a rear view of a motor vehicle 10 having embodiments of a spare tire carrier system 101'/201'/301'. As illustrated herein, reference will be made to three exemplary embodiments of spare tire carrier assemblies 101, 201, and 301, as well as to spare tire carrier systems 101', 201', and 301'. Embodiments of swing-away spare tire systems 101', 201', and 301' each comprise a swing-away spare tire assembly 101, 201, 301 respectively with a bumper 110 described below. As used herein, a swing-away spare tire carrier assembly is labeled with the reference labels 101, 201, and 301 for embodiments of the swing-away tire carrier assembly having a vertical support stub referenced by labels 130, 230, and 330 (shown schematically in FIG. 1 as dashed lines) respectively as discussed below. It shall be understood, however, that the examples illustrated in the exemplary embodiments described below are non-limiting and other swing away spare tire carrier assemblies and systems are contemplated in one or more embodiments.

As illustrated, the motor vehicle 10 has a vehicle body 12 having a fold-down tail gate 14. The spare tire carrier assembly 101/201/301 is mounted on a bumper 110 having a pin 112 which is received by a cylindrical pivot housing 122 on the spare tire carrier assembly 101/201/301. The end opposite the cylindrical pivot housing 122 has a latching mechanism 123 which secures the spare tire carrier assembly 101/201/301 to the bumper 110. The spare tire 19 comprises a tire 18 mounted on a wheel 16 which has holes 17 for mounting the spare tire 19 onto an axle of a motor vehicle 10 or onto the spare tire carrier assembly 101/201/301.

Should a user wish to access the interior of the vehicle body 12, the user would disengage the latching mechanism 123, and swing the spare tire carrier assembly 101/201/301 away from the vehicle body 12 to allow the user to open the tail gate 14. When the user closes the tailgate 14, the user may then swing the tire carrier assembly 101/201/301 back toward the motor vehicle 10, and secure the tire carrier assembly 101/201/301 in place by re-engaging the latching mechanism 123.

Figure 2:
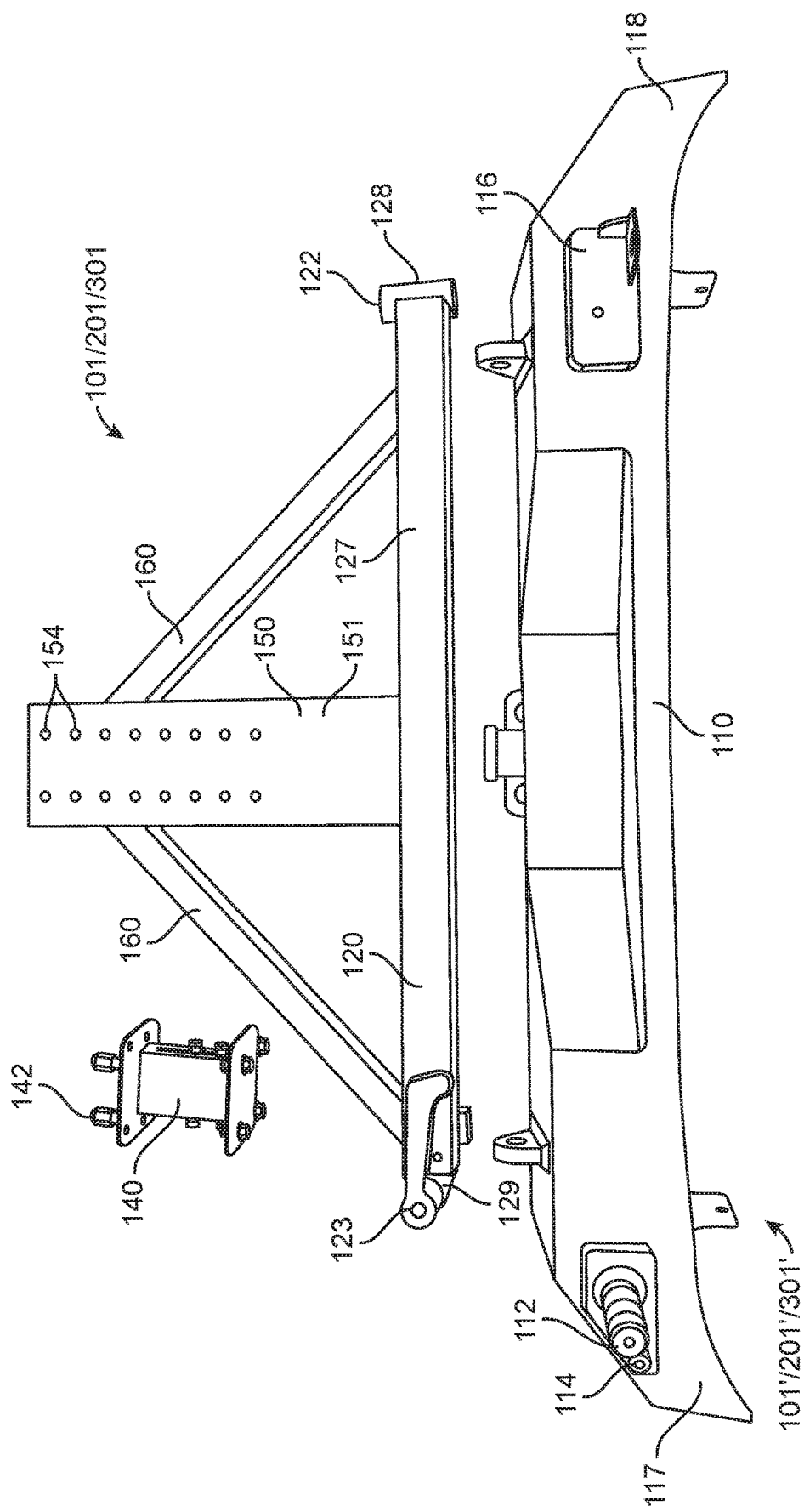
FIG. 2 is a top view of a spare tire carrier assembly disassembled from the after-market bumper.

FIG. 2 is a top view of a spare tire carrier assembly 101/201/301 partially disassembled and detached from an after-market bumper 110. The bumper 110 is configured to attach to a motor vehicle 10 and has a bumper pin 112 protruding vertically from the bumper first end 117 of the bumper 110. The bumper 110 has a latching bracket 116 on the second end 118 of the bumper, where the first end of the bumper 117 is opposite the second end of the bumper 118. The bumper 110 has a stop 114 for limiting the swing of the spare tire carrier assembly 101/201/301.

The spare tire carrier assembly 101/201/301 comprises a horizontal arm 120, a U-shaped center bracket 150 having a front face 151, two diagonal lateral support brackets 160, and a tire mounting bracket 140 having threaded bolts 142 for coupling to the holes 17 of the spare tire 19.

The horizontal arm 120 has a front section 127 and first arm end 128 pivotally configured to be connected to a bumper 110 of a vehicle 10 via the cylindrical pivot housing 122. The horizontal arm 120 has a second arm end 129 having a latching mechanism 123. The first arm end 128 is opposite to the second arm end 129. In an embodiment, the horizontal arm 120 is fabricated from a hollow structural steel rectangular tube and has a vertical height of approximately 3 inches and a width of approximately 2 inches, with a metal thickness of approximately 0.125 inch. In an embodiment, the cylindrical pivot housing 122 comprises a section of a hollow structural steel round tube which is welded to the horizontal arm 120.

The U-shaped center bracket 150 has a front face 151 with a plurality of through tire bracket/center bracket holes 154 for mounting the tire mounting bracket 140. The U-shaped center bracket 150 has a metal thickness of approximately 0.1875 inches. The two diagonal lateral support brackets 160 are attached to the horizontal arm 120 and to the U-shaped center bracket 150 and provide additional rigidity of the spare tire carrier assembly 101/201/301 and lateral support for the center bracket 150.

Figure 3:
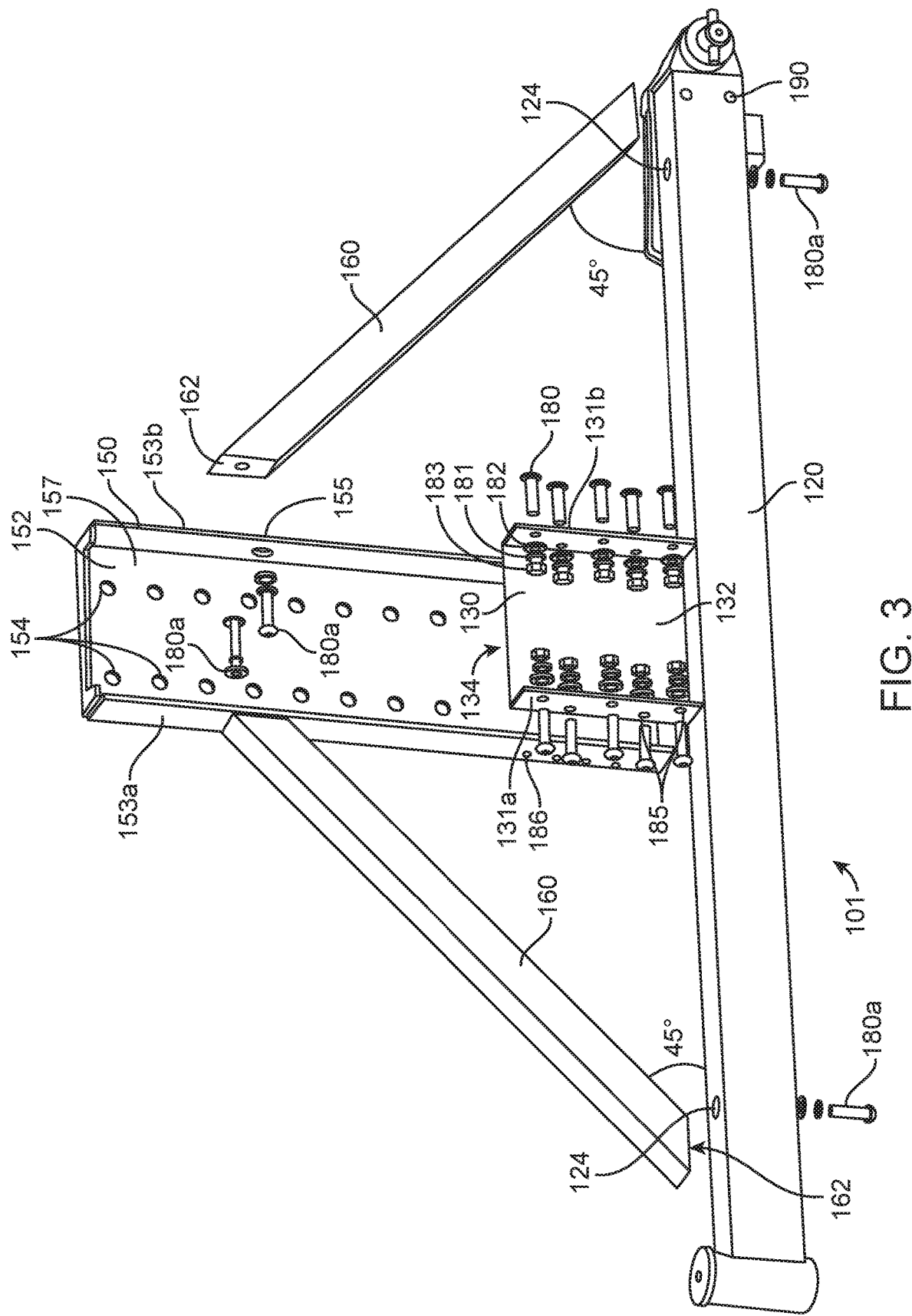
FIG. 3 is a rear, exploded view of a spare tire carrier assembly.

FIG. 3 is a rear, exploded view of one embodiment of a spare tire carrier assembly 101, showing details of the vertical support stub 130 and the U-shaped center bracket 150. The U-shaped vertical support stub 130 is affixed to the horizontal arm 120. In an embodiment, the vertical support stub 130 is welded to the horizontal arm 120. The vertical support stub 130 has a vertical support stub back plate 132 that emerges perpendicular to the length of the horizontal arm 120 and two vertical support side plates 131a and 131b emerging perpendicular away from the vertical support stub back plate 132. The vertical support stub 130 has a plurality of center bracket/stub through-holes 185 for mounting to the vertical support stub 130. The vertical support stub 130 has a metal thickness of approximately 0.1875 inches.

The U-shaped center bracket 150 has a center bracket back plate 157 and a first 153a and a second center 153b bracket side plates emerging perpendicular away from the center bracket back plate 157 on opposite sides of the center bracket 150. The center bracket 150 has a plurality of center bracket mounting holes 186 and the vertical support stub 130 has a plurality of corresponding center bracket/stub through holes 185. The center bracket 150 is secured to the vertical support stub 130 with a plurality of fasteners including a threaded bolt 180, a split washer 181, a flat washer 182, and a nut 183. The back face 152 of the center bracket 150 surrounds the front face 134 of the vertical support stub 130.

As used herein and as is commonly known in the art, the term "bolt" refers to a variety of threaded fasteners having different forms of heads including a hexagonal head and socket heads including Allen heads, Phillips heads, slotted heads, square heads, button heads, or star heads for example.

Figure 4:
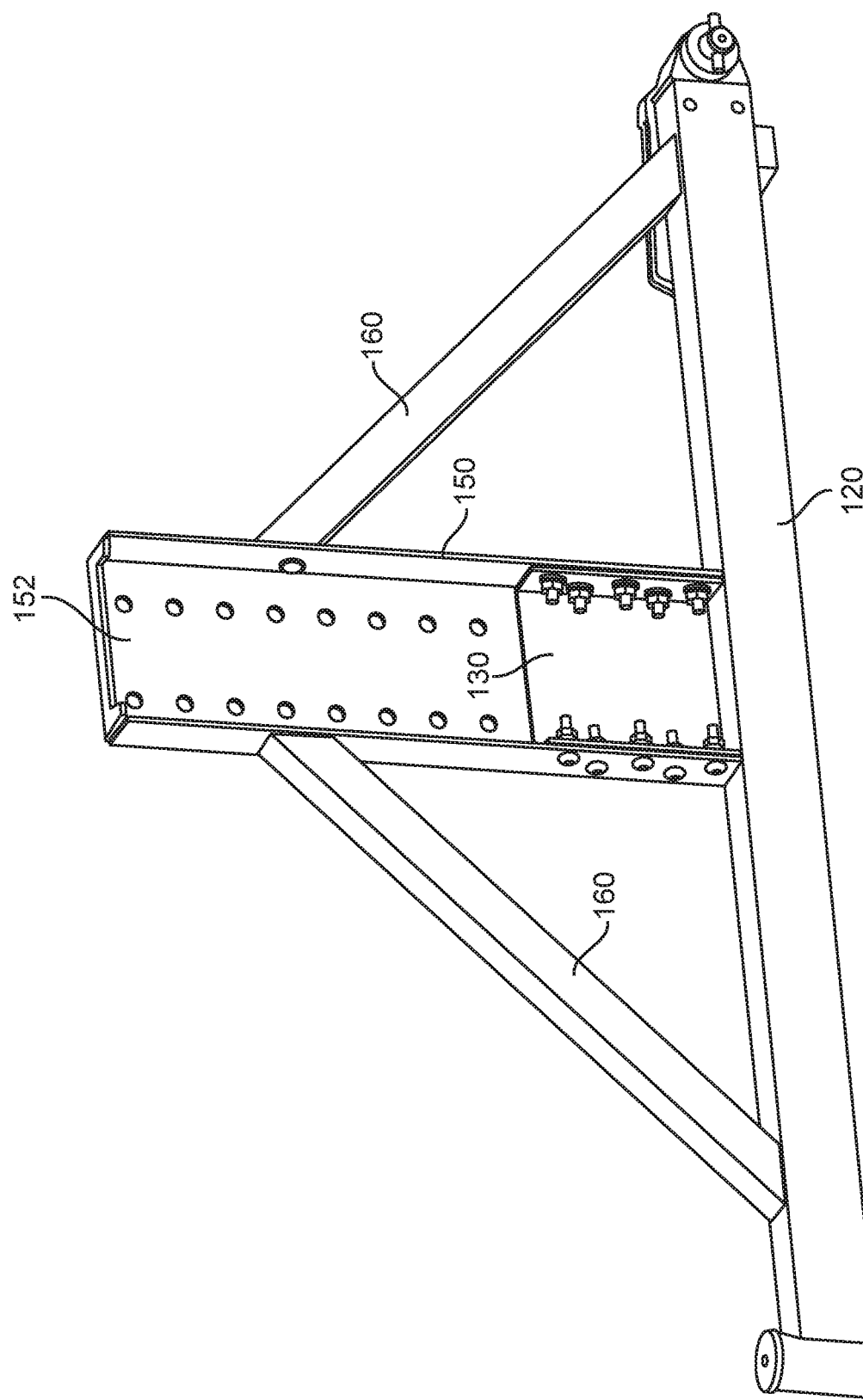
FIG. 4 is a rear view of an assembled spare tire carrier assembly.

The diagonal lateral support brackets 160 are attached to the horizontal arm 120 and to the center bracket 150 at an angle of approximately 45 degrees in an embodiment. Bolt 180 is placed though the hole 124 of the horizontal arm 120. Bolts 180a are also used to secure the diagonal lateral support brackets 160 to the center bracket 150 through center bracket/diagonal lateral support holes 155. Each diagonal lateral support bracket 160 has a threaded end plate 162 secured to the opposite ends of the diagonal lateral support brackets configured to receive a bolt 180. The diagonal lateral support brackets 160 are designed so that the bolts 180a to secure the diagonal lateral support brackets to the center bracket 150 and the horizontal arm are hidden from view while in use. FIG. 4 is a rear, assembled view of a spare tire carrier assembly 101.

Figure 5:
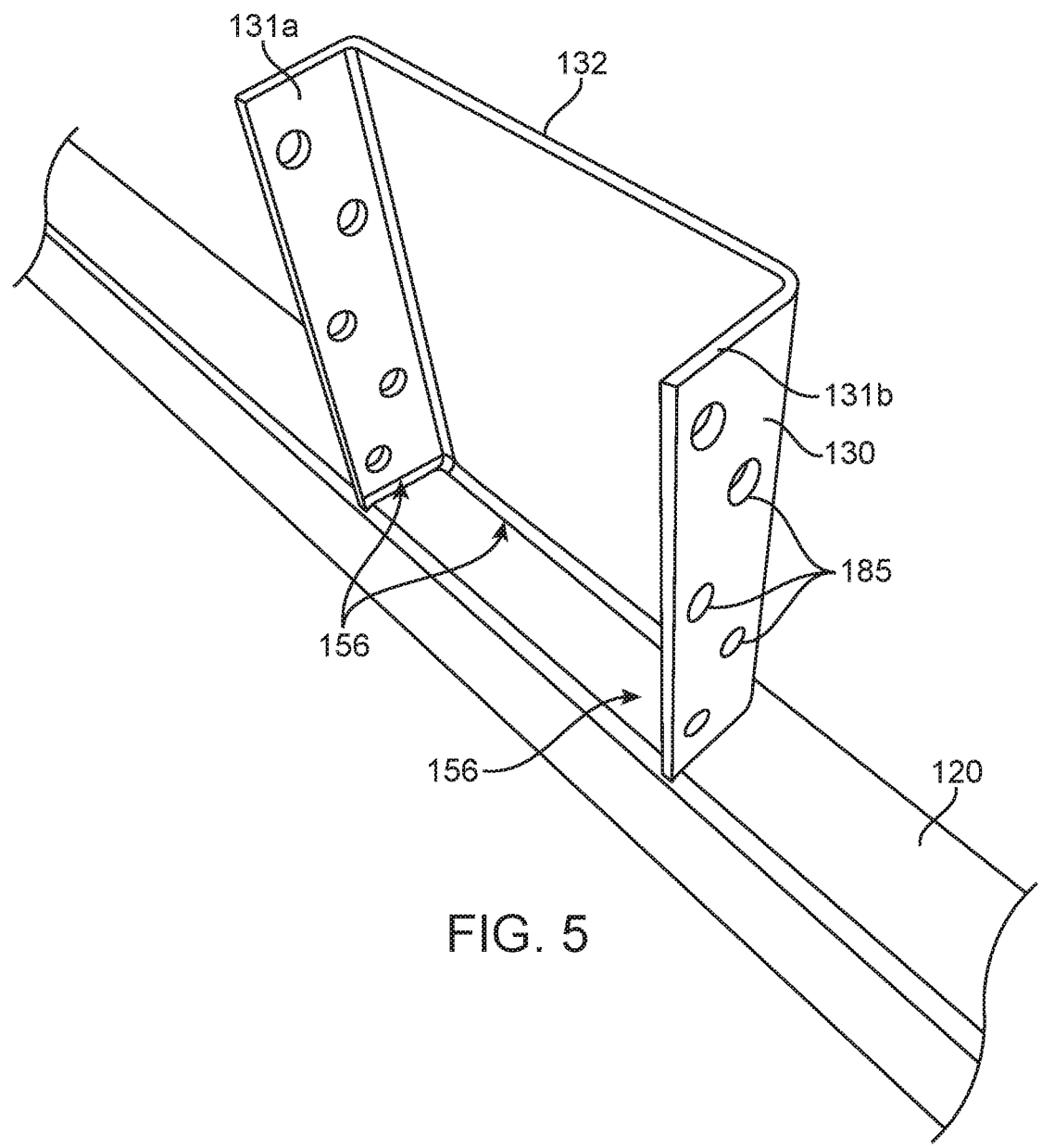
FIG. 5 is a top, perspective view of the vertical support stub attached to the horizontal arm.

FIG. 5 is a top, perspective view of the vertical support stub 130 attached to the horizontal arm 120. In an embodiment, the vertical stub back pate 132, and sides 131a and 131b are welded to the horizontal arm 120, where the welds 156 permanently affix the vertical support stub 130 to the horizontal arm 120. In an embodiment, welds 156 are formed between the horizontal arm 120 to the vertical support side plates 131a and 131b, as well as to the vertical support back plate 132.

Figure 6:
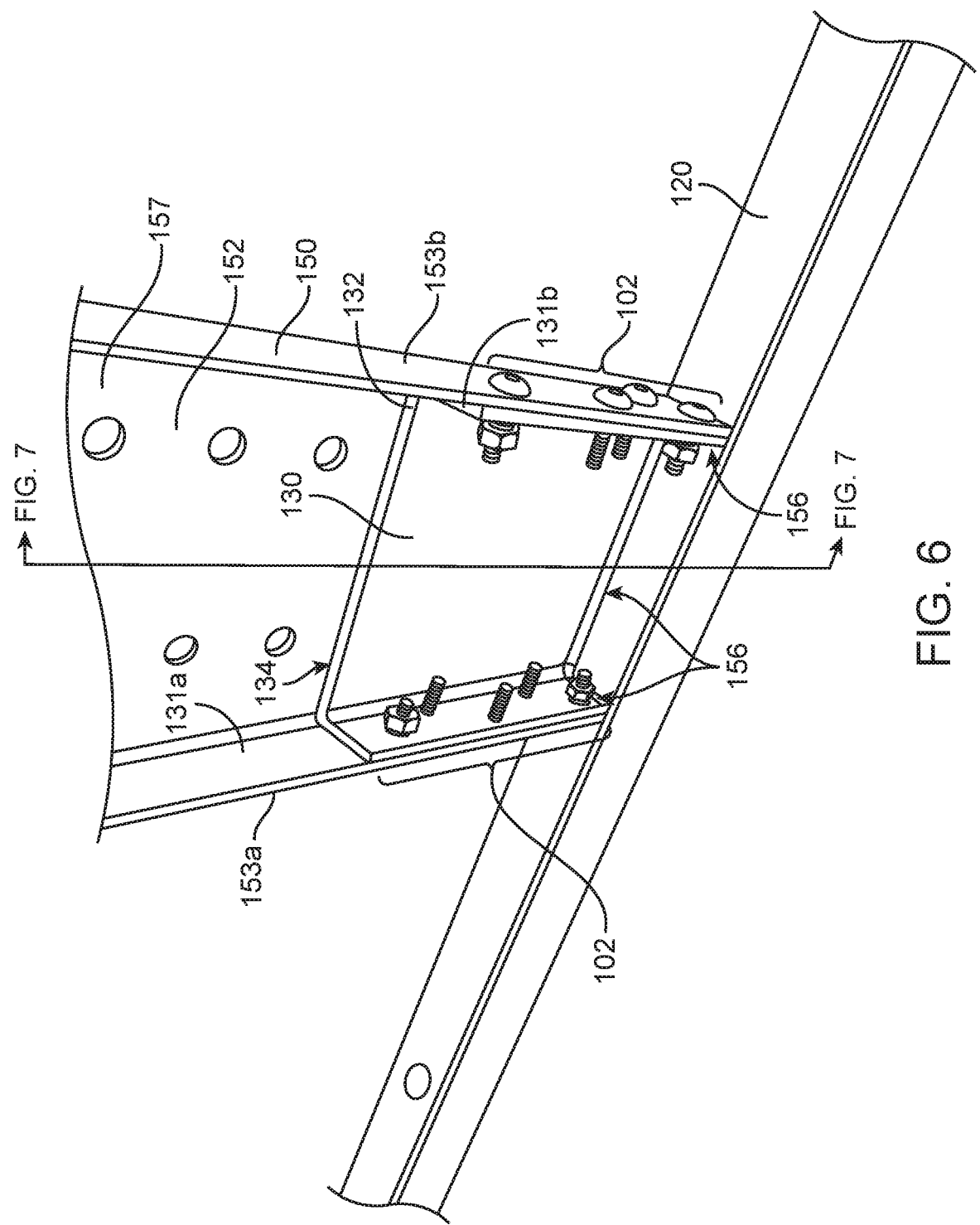
FIG. 6 is a rear, perspective view of the U-shaped center bracket attached to the vertical support stub.

FIG. 6 is a rear, perspective view of the U-shaped center bracket 150 attached to the vertical support stub 130. The center bracket 150 comprises the back plate 157 and the side plates 153a and 153b that partially wrap around the front face 134 of the vertical support stub 130, where the vertical support stub 130 has a back plate 132 and side plates 131a and 131b. A double wall 102 is an inherent result of the design and is formed by the center bracket 150 mating with and partially surrounding the vertical support stub 130 such that the effective thickness of the combined vertical support stub 130 and center bracket 150 is the thickness of the center bracket 150 and the thickness of the vertical support stub. In other words, the double wall 102 provides essentially twice the thickness of metal at a critical section of the spare tire carrier assembly 101.

Figure 7:
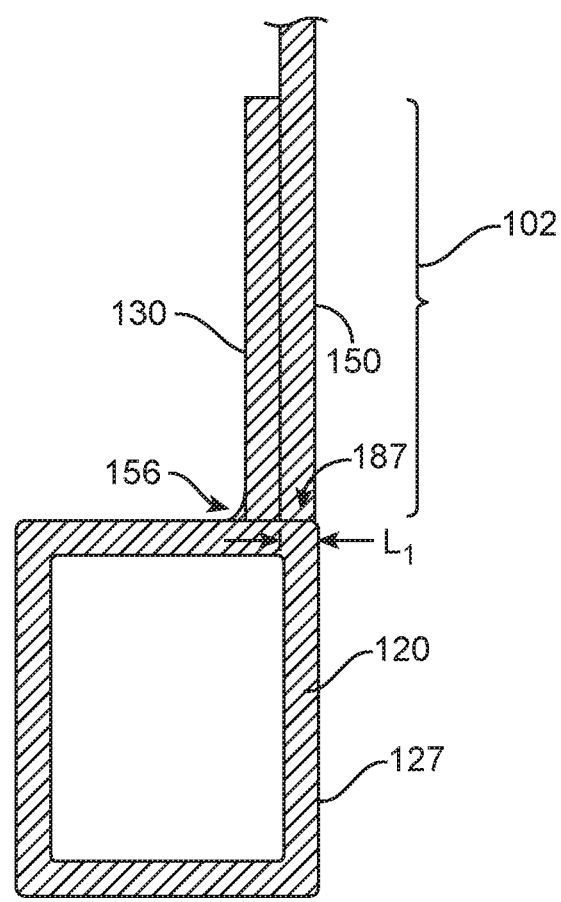
FIG. 7 is a cross-sectional view of the U-shaped center bracket attached to the vertical support stub as shown in FIG. 6.

FIG. 7 is a cross-sectional view of the U-shaped center bracket 150 attached to the vertical support stub 130 as shown in FIG. 6. The U-shaped vertical stub 130 is recessed with respect to front section 127 of the horizontal arm 120, as indicated by the term "$L_1$."

In an embodiment, $L_1$ is approximately 0.1875 inches, which is also the thickness of the center bracket 150 in one or more embodiments. Hence, the horizontal arm 120 is in physical contact with the top 187 of the center bracket 150 and provides additional vertical support to the center bracket 150. The center bracket 150 is flush with the front surface 127 of the horizontal arm 120.

Figure 8:
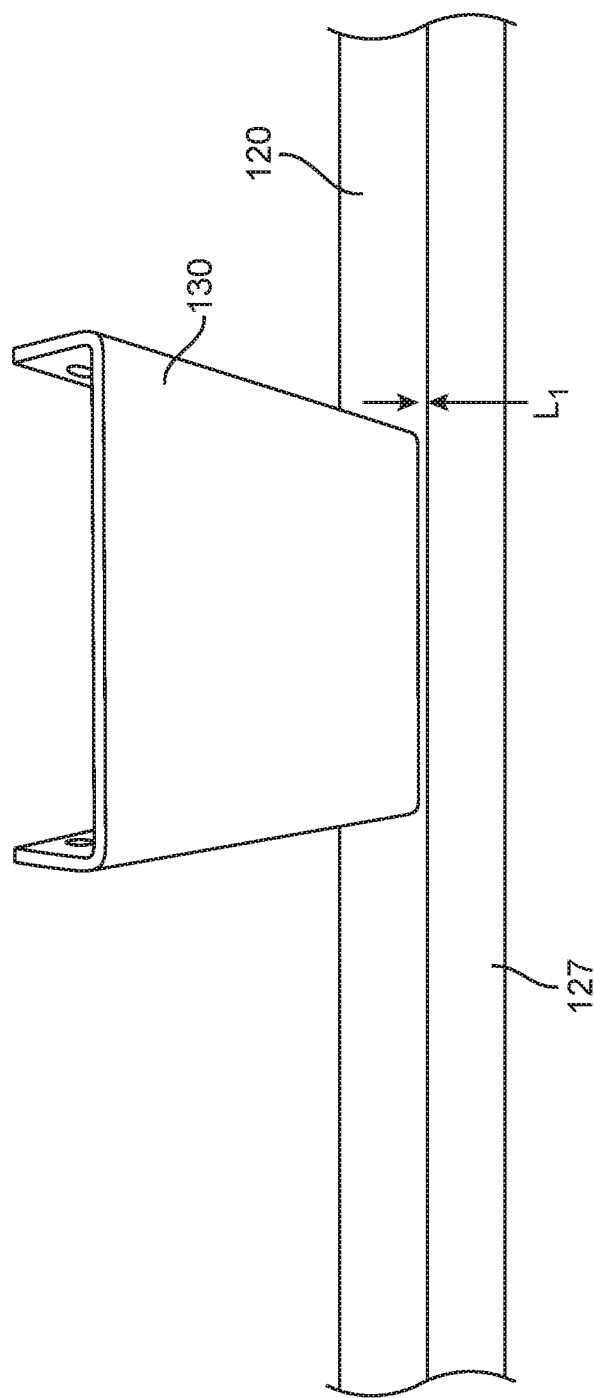
FIG. 8 is a front view of the vertical support stub that is recessed from the front of the horizontal arm.
Figure 9:
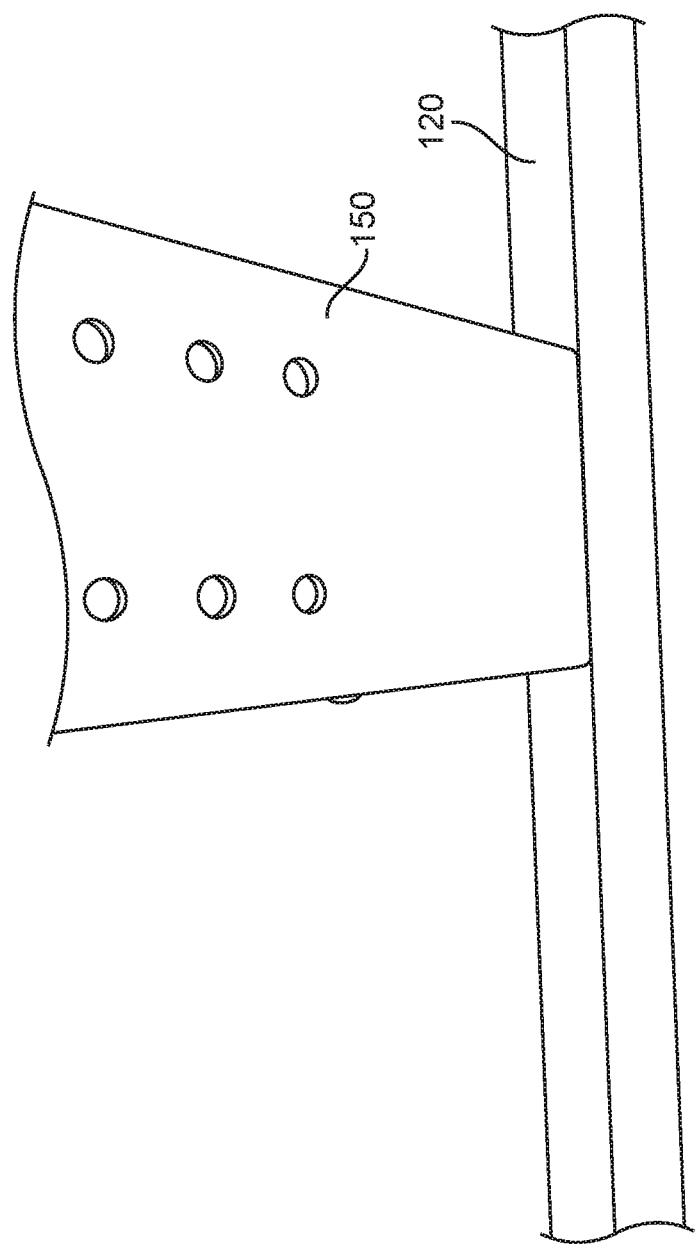
FIG. 9 is a front view of the U-shaped center bracket mounted onto the vertical support stub.

FIG. 8 presents a front perspective view of the offset $L_1$ of the vertical support stub 130 with respect to the front 127 of the horizontal arm 120. FIG. 9 is a front view of the U-shaped center bracket 150 mounted onto the vertical support stub, showing that the center bracket 120 is essentially flush with the front surface 127 of the horizontal arm 120.

Figure 10:
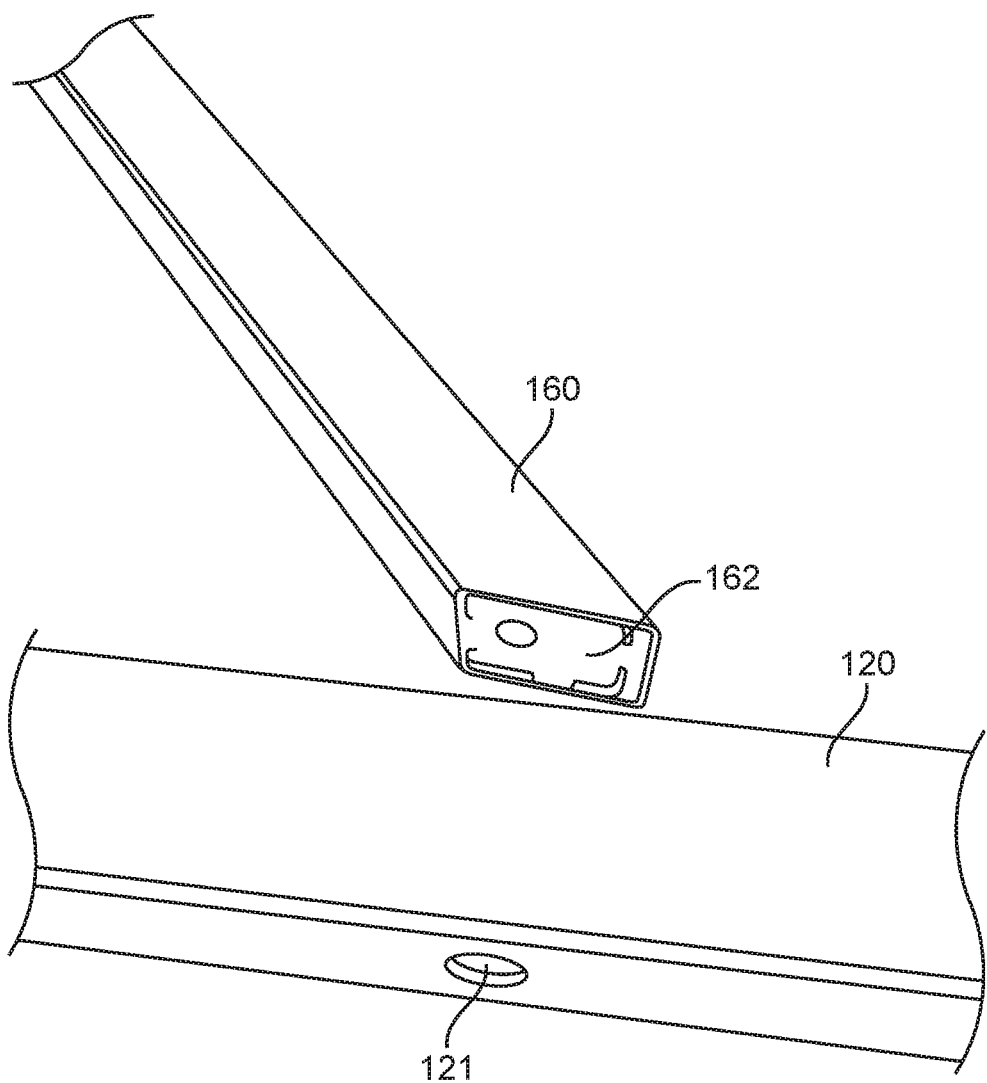
FIG. 10 is a bottom view showing details of the horizontal arm and the diagonal lateral support bracket.

FIG. 10 is a bottom view showing details of the horizontal arm 120 and the diagonal lateral support bracket 160. Each diagonal lateral support bracket 160 has a threaded end plate 162 secured to the opposite ends of the diagonal lateral support brackets 160 configured to receive a bolt 180. The horizontal arm 120 has access holes 121 for placing a bolt 180 through the horizontal arm 120.

Figure 11:
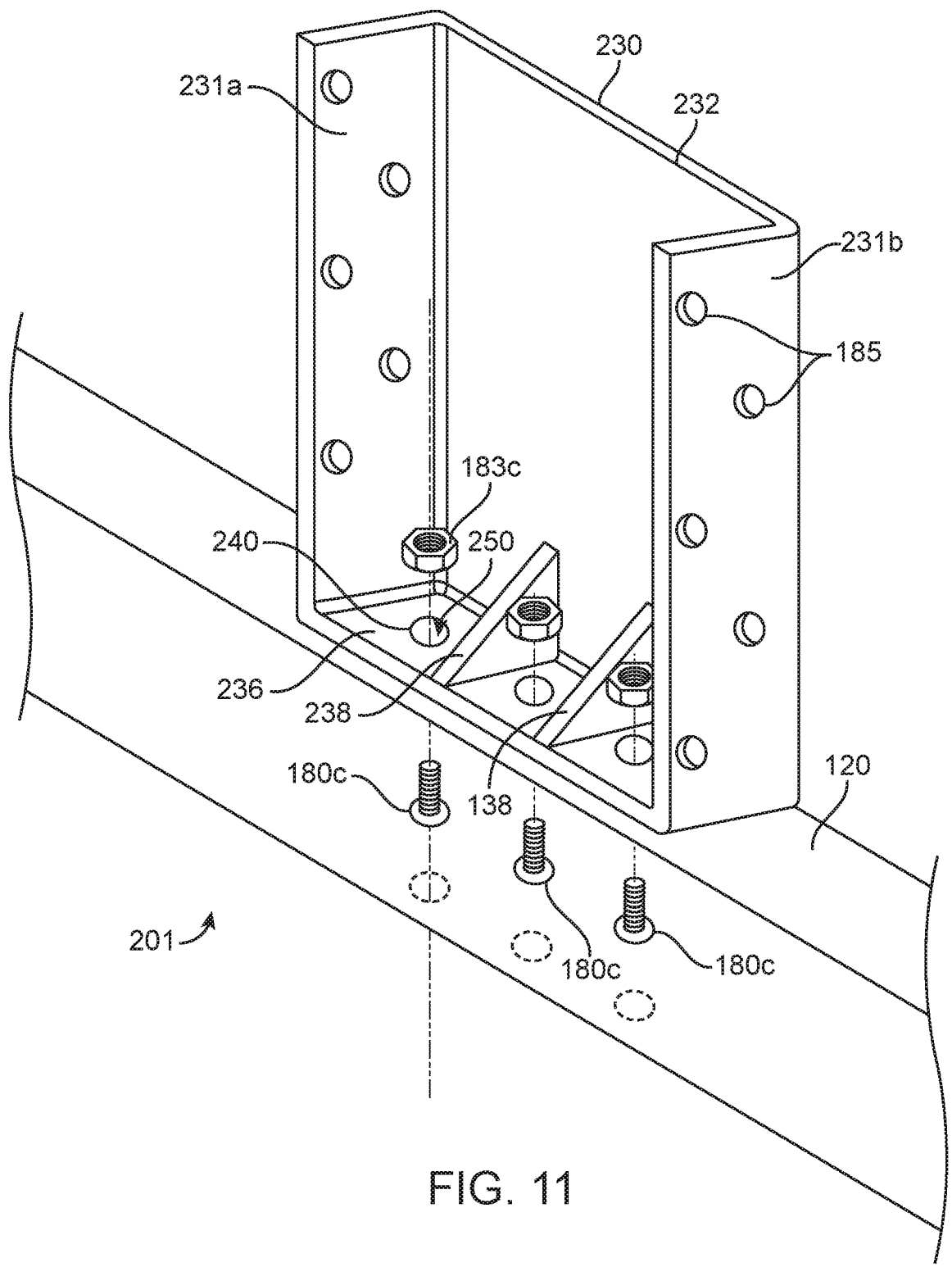
FIG. 11 is a rear view of a vertical support stub bolted to the horizontal arm in one or more embodiments.
Figure 12:
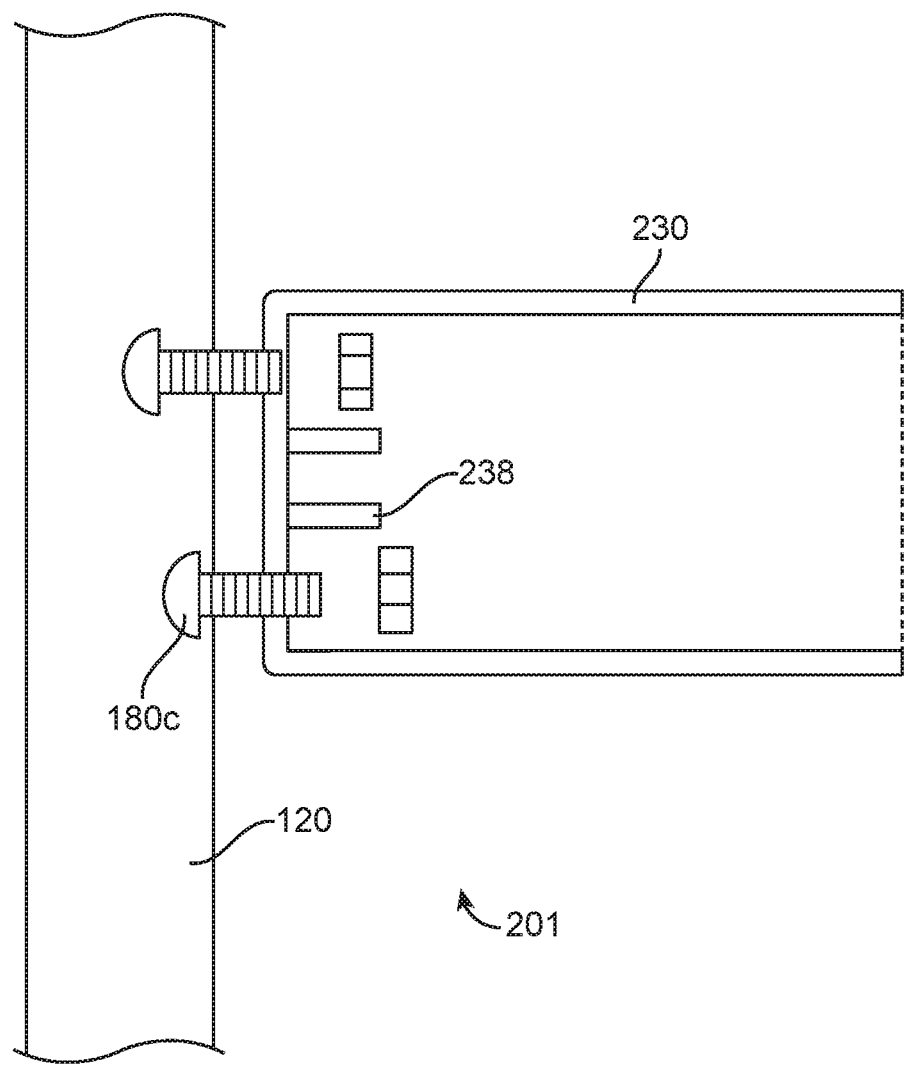
FIG. 12 is a cross-sectional view of a vertical support stub bolted to the horizontal arm in one or more embodiments.

FIG. 11 is a rear view of a section of an embodiment for a swing away spare tire carrier assembly 201 showing a vertical support stub 230 bolted to the horizontal arm 120 in one or more embodiments. The U-shaped vertical support stub 230 comprises vertical support stub back plate 232, vertical support stub side plates 231a and 231b, and a vertical support stub bottom plate 236. The vertical stub bottom plate 236 is perpendicular to the vertical support stub back plate 232 and to the two vertical support side plates 231a and 231b. The vertical support horizontal bottom plate 236 has a plurality of holes 240. The horizontal arm 120 has a plurality of corresponding holes 250, where the stub bottom plate 236 is configured to be bolted to the horizontal arm 120 with a plurality of bolts 180c. In an embodiment, the vertical support stub 230 has reinforcing gussets 238 which connect the vertical support stub bottom plate 236 to the vertical stub back plate 232. In an embodiment, the gussets 238 are welded to the vertical support stub bottom plate to the vertical support stub back plate 232. FIG. 12 is a cross-sectional view of a vertical support stub 230 bolted to the horizontal arm 120 in one or more embodiments.

Figure 13:
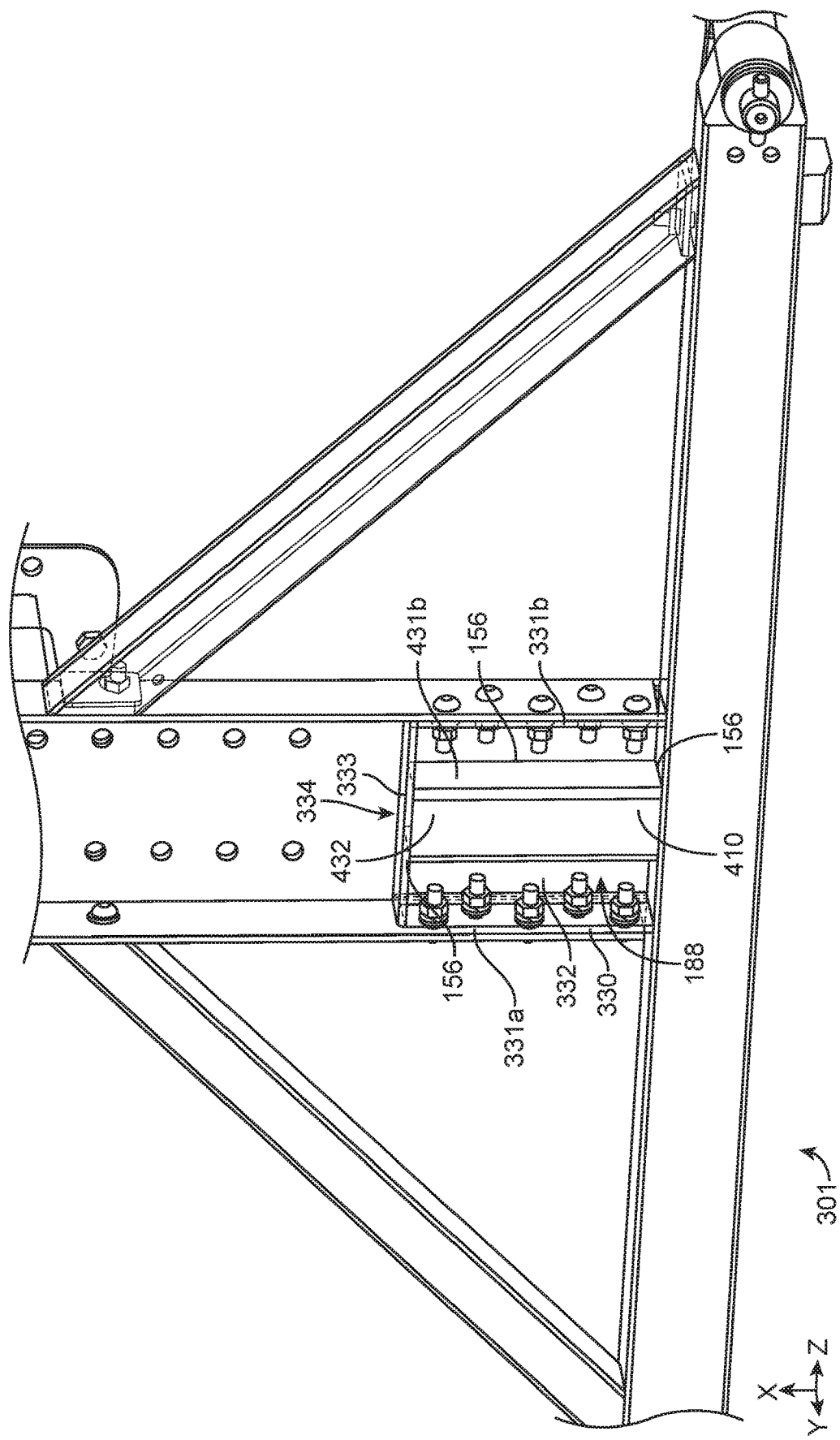
FIG. 13 is a rear, perspective view of vertical support stub having a reinforcing member in a preferred embodiment.
Figure 14:
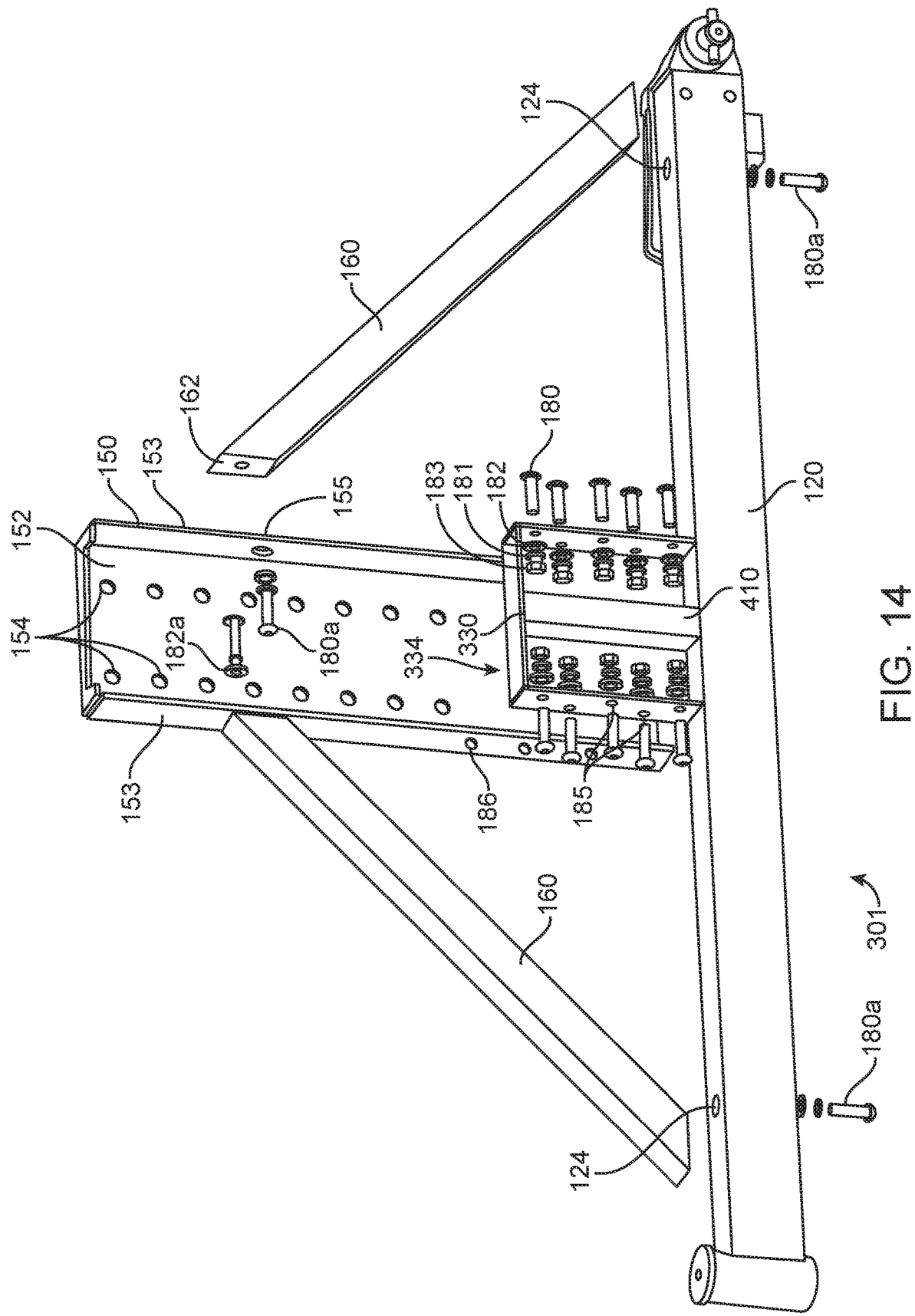
FIG. 14 is a rear, perspective view of disassembled swing away spare tire carrier assembly in a preferred embodiment.
Figure 15:
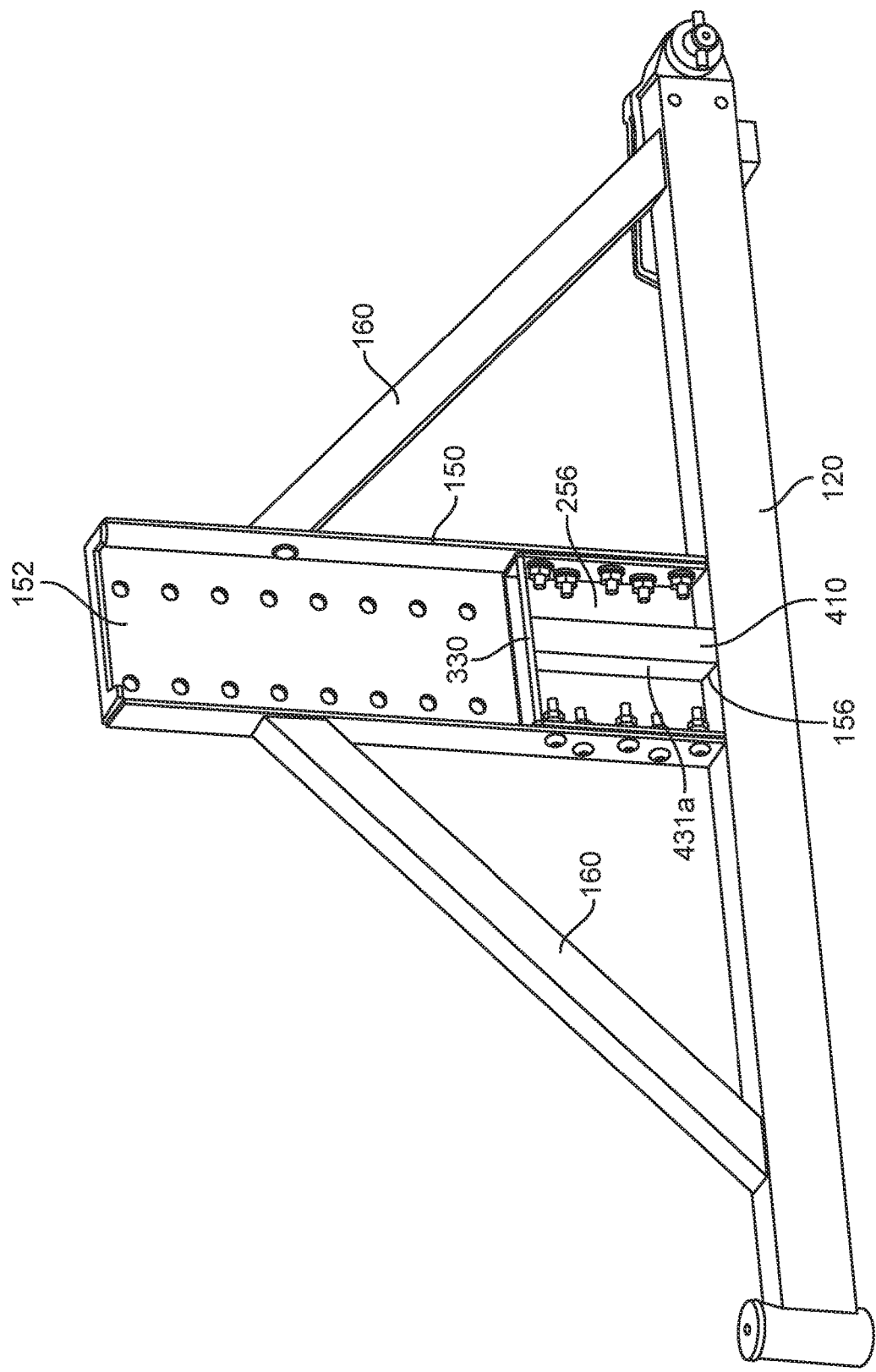
FIG. 15 is a rear, assembled view of a spare tire carrier assembly.
Figure 16:
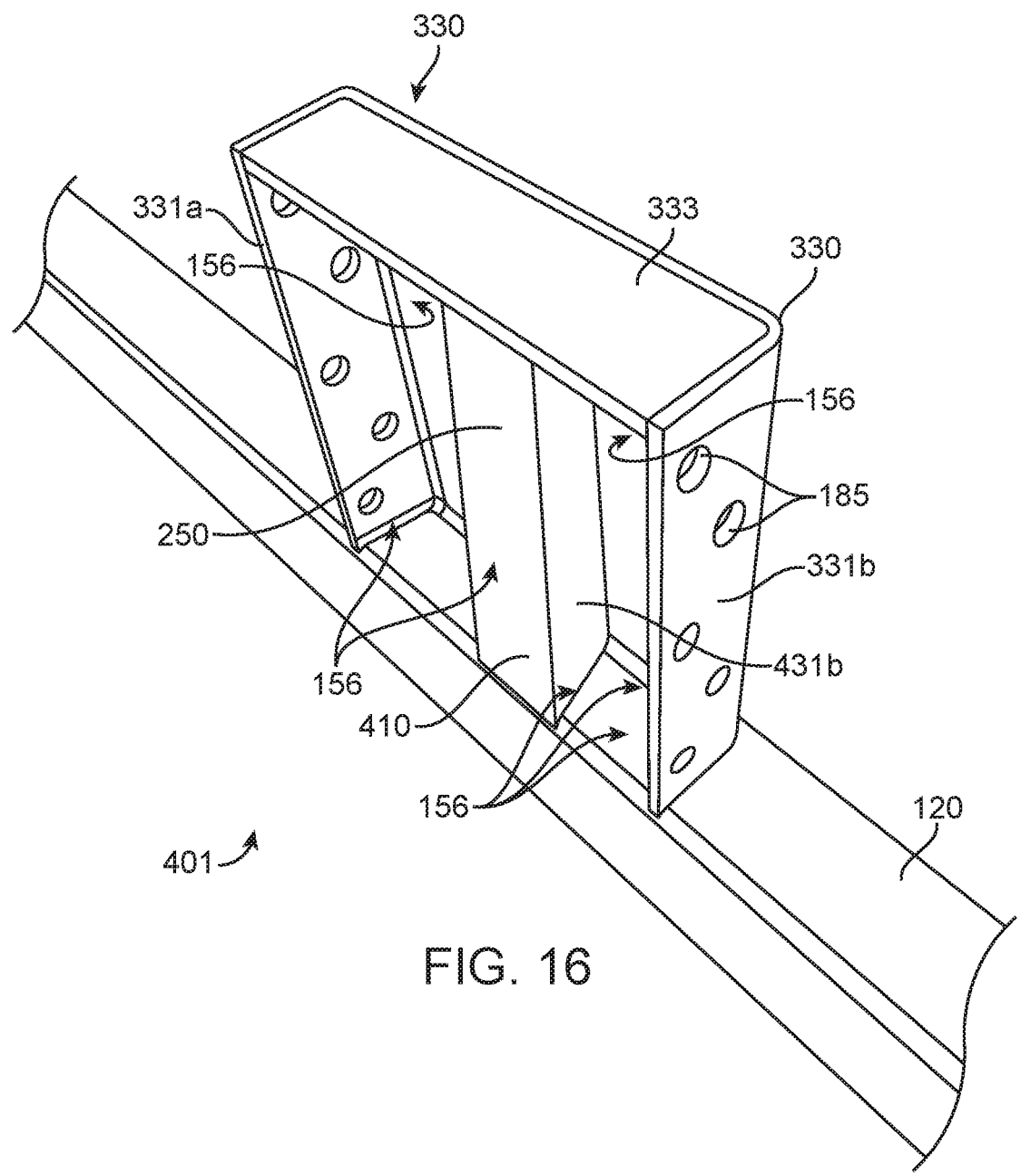
FIG. 16 is a top, perspective view of the vertical support stub having a reinforcing member in a preferred embodiment.

FIGS. 13-16 depict one or more preferred embodiments for a spare tire carrier assembly 301 comprising a vertical support stub 330 having a reinforcing member 401. FIGS. 13-15 are rear, perspective views of vertical support stub having a reinforcing member in a preferred embodiment. FIG. 16 is a top, perspective view of the vertical support stub 330 having a reinforcing member 401 in a preferred embodiment.

A U-shaped vertical support stub 330 is affixed to the horizontal arm 120. The vertical support stub 330 has a vertical support stub back plate 332 perpendicular to the length of the horizontal arm 120. Two vertical support side plates 331a and 331b emerge perpendicular away from the vertical support stub back plate 332. A vertical stub top plate 333 is affixed to the top of the vertical support stub back plate 332 and the two vertical support stub side plates 331a and 331b. The vertical support stub having a plurality stub through-holes 185.

Within the channel 188 of the U-shaped vertical support stub 330, a U-shaped reinforcing member 401 is affixed in a preferred embodiment. The U-shaped reinforcing member 401 has two side plates (i.e., flanges) 431a and 431b, as well as a back plate 432. The reinforcing member 401 is secured within the U-shaped vertical support stub 330 with the two side plates 431a and 431b secured to the vertical stub back plate 332. The reinforcing member 401 extends vertically from the horizontal arm 120 to the vertical support stub top plate 333.

As depicted in FIGS. 13-16, the vertical support stub 330 having a reinforcing member 401 provide for longer weld joints 156 to be formed. Weld joints 156 are formed on the horizontal arm 120 within the vertical support stub 330 as well as around the reinforcing member 401. Weld joints 156 are also formed from the side pates 431a and 431b to the back plate 332 of the vertical support stub 330. And finally, weld joints 156 are formed around the top of the reinforcing member 401 to the top plate 333 of the vertical support stub 330.

FIG. 14 is a rear, exploded view of a spare tire carrier assembly 301 showing details of the vertical support stub 330 and the U-shaped center bracket 150. The U-shaped center bracket 150 is shaped to surround the front face vertical support stub back plate 332 and the two vertical support stub side plates 331a and 331b. The enter bracket 150 is secured to the vertical support stub 130 with a plurality of fasteners including a threaded bolt 180, a split washer 181, a flat washer 182, and a nut 183. The back face 152 of the center bracket 150 surrounds the front face 334 of the vertical support stub.

The diagonal lateral support brackets 160 are attached to the horizontal arm 120 and to the center bracket 150. Bolt 180 is placed though the hole 124 of the horizontal arm 120. Bolts 180a are also used to secure the diagonal lateral support brackets 160 to the center bracket 150. Each diagonal lateral support bracket 160 has a threaded end plate 162 secured to the opposite ends of the diagonal lateral support brackets configured to receive a bolt. FIG. 15 is a rear, assembled view of a spare tire carrier assembly 301.

Figure 17:
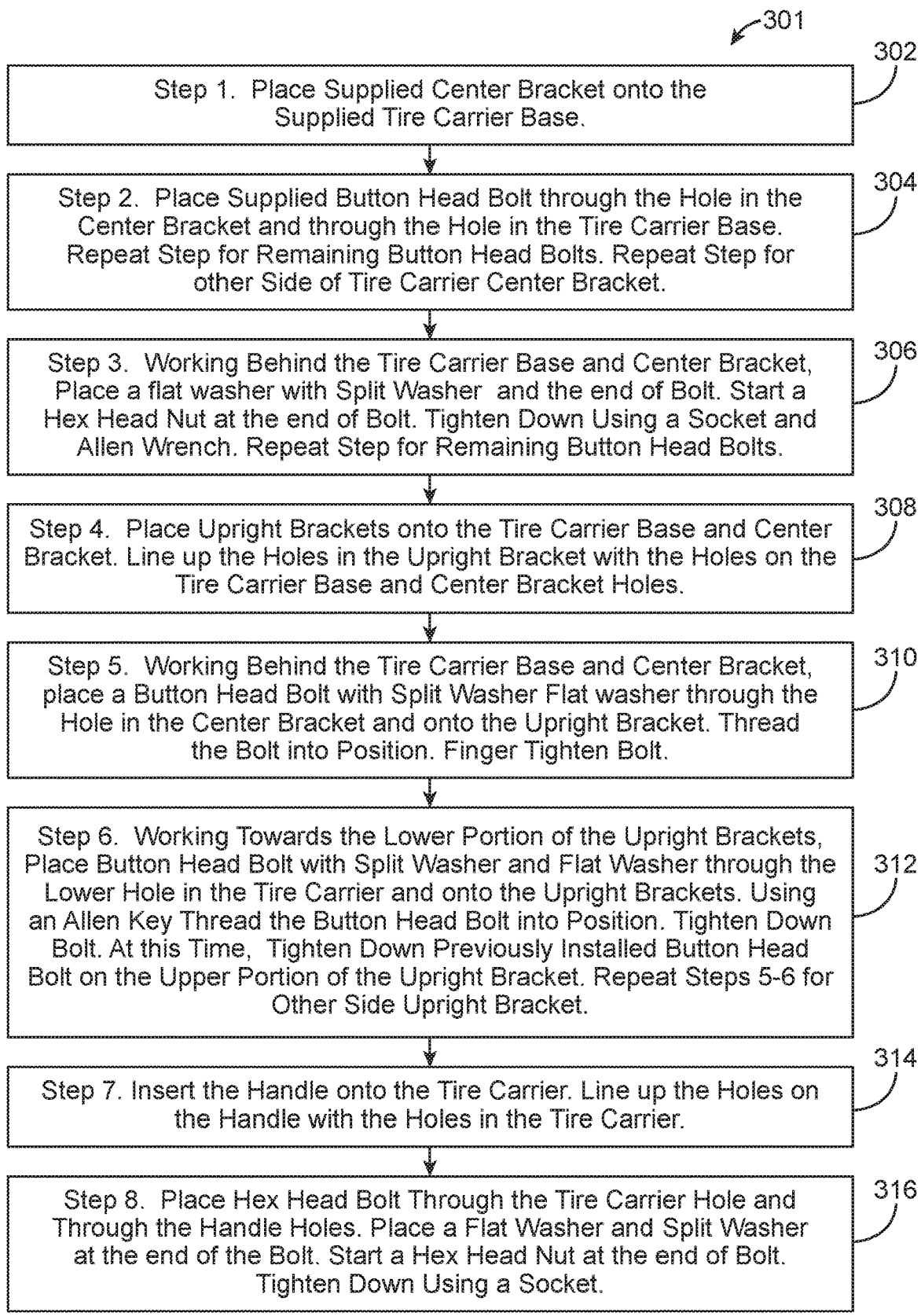
FIG. 17 is a flowchart showing an exemplary process for assembling the spare tire carrier assembly.

FIG. 17 is a flowchart 301 showing an exemplary process for assembling the spare tire carrier assembly 101/201/301. In a preferred embodiment, the spare tire carrier 101/201/301 is an after-market product which is assembled and installed into a factory original motor vehicle 10. The term "after-market" refers products and processes that may be developed by third-parties other than the vehicle manufacturer, and may involve altering, modifying, or adding components to a factory original vehicle.

The end user performs the following steps:

Step 1: The end user places the supplied Center Bracket 150 onto the supplied Tire Carrier Base. The Tire Carrier Base comprises the vertical support stub 130/230/330 affixed to the horizontal arm 120. (step 302).

Step 2: The user places the supplied button head bolt 180 through the center bracket/stub through holes 185 and the corresponding center bracket mounting holes 186. (See FIG. 3 for example). The user repeats this step for remaining button head bolts 180. This step is repeated for other side of the Center Bracket 150. (step 304).

Step 3: Working behind the center bracket 150 surrounding the vertical support stub 130, the user should place a flat washer 182 with split washer 181 at the end of bolt 180. Start a hex head 183 nut at the end of bolt 180. The user should tighten down using a socket and Allen Wrench. The user should repeat this step for the remaining button head bolts. (step 306).

Step 4. The user should place the diagonal lateral support brackets 160 (i.e., Upright Brackets) onto the horizontal arm 120 and the Center Bracket 150. The user should line up the holes (i.e., threaded end plate 162) in the diagonal lateral support brackets 160 with the center bracket/diagonal lateral support holes 155 on the center bracket 150. (step 308).

Step 5: The user should place a button head bolt 180 with a split washer 181 and a flat washer 182 through the hole 155 in the Center Bracket 150 and onto the diagonal lateral support brackets 160 (i.e., Upright brackets). The user should thread the bolt 180 into position and finger tighten the bolt 180. (step 310).

Step 6: Working towards the lower portion of the diagonal lateral support brackets 160 (i.e., Upright Brackets), the user should place button head bolt 180 with split washer 181 and flat washer 182 through the access hole 121 in the horizontal arm 120 and onto the diagonal lateral support brackets 160. (See FIG. 10). Using an Allen Key, the user should thread the button head bolt 180 into position and tighten down the bolt 180. At this time, the user should tighten down previously installed button head bolt 180 on the upper portion of the diagonal lateral support brackets 160. The user should repeat Steps 5-6 for other side. (step 312).

Step 7: The user should insert the latching mechanism 123 (i.e., Handle) onto the horizontal arm 120, and line up the holes on the latching mechanism 123 the holes 190 in the horizontal arm 120. (step 314)

Step 8: The user should place the hex head bolt 180 through the hole 190 in the horizontal arm 120 and through the latching mechanism 123. The user should place a flat washer 182 and split washer 181 at the end of the Bolt. The user should start a hex head nut 183 at the end of bolt 180 and tighten down using a socket. (Step 316). This completes the installation.

Figure 18:
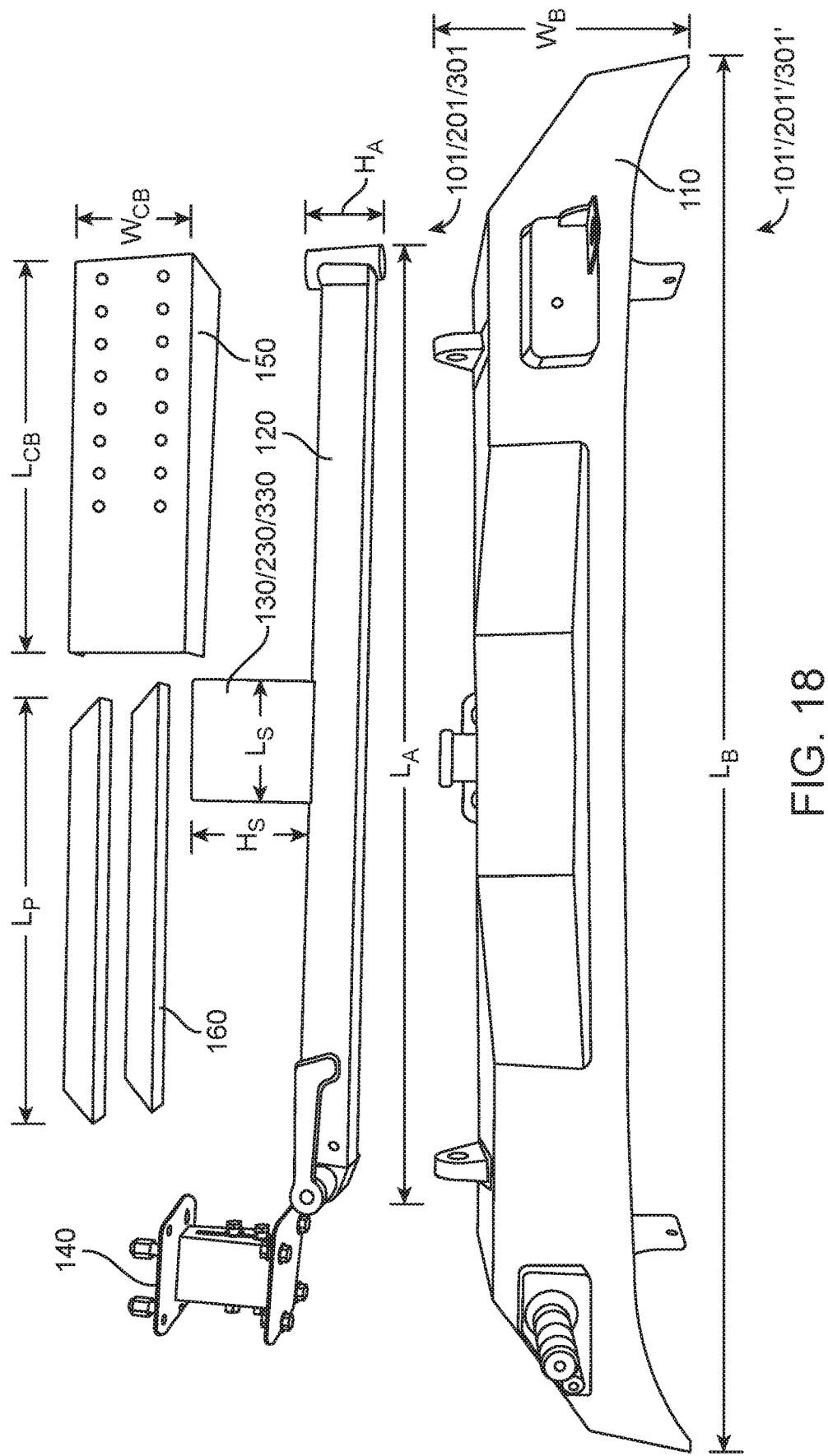
FIG. 18 is a top view of a disassembled spare tire carrier assembly and bumper indicating approximate dimensions.

FIG. 18 is a top view of a disassembled spare tire carrier system 101'/201'/301' in preparation for shipping to an end user. Table I below indicates the approximate dimensions for the main components of a spare tire carrier system 101'.

TABLE I

| Part | Symbol | Approximate Value (inches) |
| --- | --- | --- |
| Diagonal lateral support brackets 160 length | $L_P$ | 24 |
| Center Bracket 150 length | $L_{CB}$ | 20 |
| Center Bracket 150 Width | $C_B$ | 7 |
| Horizontal Arm 120 Length | $L_A$ | 48 |
| Horizontal Arm 120 Width | $H_A$ | 4 |
| Vertical Support Stub 130/230/330 Height | $H_S$ | 7 |
| Vertical Support Stub 130/230/330 Length | $L_S$ | 7 |
| Bumper 110 Length | $L_B$ | 50 |
| Bumper 110 Width | $W_B$ | 4 |

Figure 19:
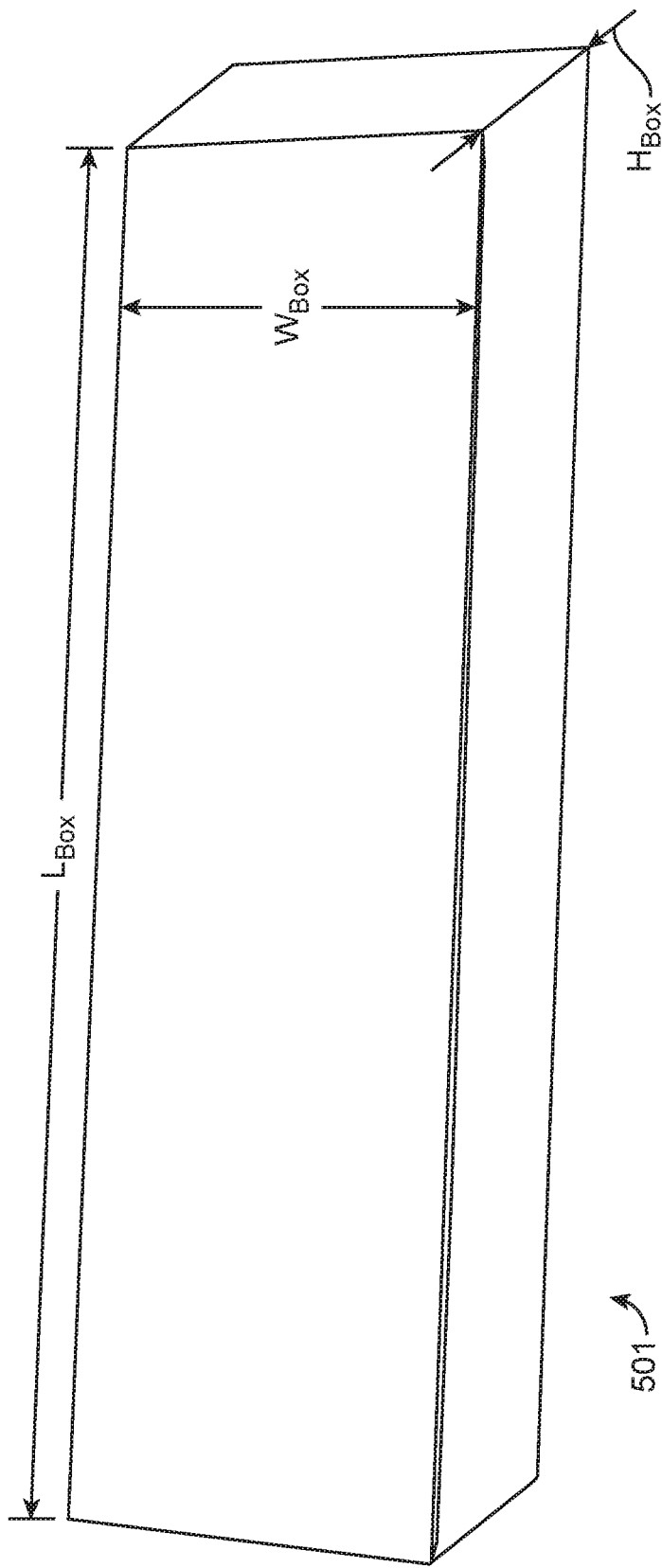
FIG. 19 is a top, perspective view of a package for shipping the disassembled spare tire carrier assembly and bumper.

FIG. 19 is a top, perspective view of a shipping container 501 for a disassembled spare tire carrier system 101'/201'/301', with the approximate dimensions of the container 501 presented in Table II below.

In one or more embodiments, the overall vertical height $H_S$ of the vertical support stub and the horizontal arm 120 is approximately 10 inches (i.e., approximately $H_S+H_A$), and the height of the center bracket 150 is approximately 20 inches. As the center bracket 150 is shipped detached from the vertical support stub 130/230/330, the shipping container for embodiments described herein are reduced compared to shipping containers for conventional tire carriers. In an embodiment, the shipping container holding a tire carrier assembly and a bumper has the dimensions of 50 inches length×15 inches height×8 inches width. Hence, shipping containers 501 of embodiments described herein may have reduced vertical dimensions of 9 inches for a reduction of vertical height of 37.5%.

TABLE II

| Shipping Container Dimension | Symbol | Approximate Value (inches) |
| --- | --- | --- |
| Length | $L_{BOX}$ | 50 |
| Width | $W_{BOX}$ | 15 |
| Height | $H_{BOX}$ | 8 |

Although the invention has been discussed with reference to specific embodiments, it is apparent and should be understood that the concept can be otherwise embodied to achieve the advantages discussed. The preferred embodiments above have been described primarily as swing-out spare tire carrier assemblies and systems designed shipping with reduced costs. In this regard, the foregoing description of the spare tire assembly and system is presented for purposes of illustration and description.

Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A swing-away spare tire carrier assembly for a motor vehicle, comprising:
 a horizontal arm having a front section and first arm end pivotally configured to be connected to a bumper of a vehicle, the horizontal arm having a second arm end having a latching mechanism, the first arm end opposite to the second arm end;
 a U-shaped vertical support stub affixed to the horizontal arm, the vertical support stub having a vertical support stub back plate perpendicular to the length of the horizontal arm and two vertical support stub side plates emerging perpendicular away from the vertical support stub back plate, the vertical support stub having a plurality stub through-holes; and,
 a U-shaped center bracket, the center bracket having a center bracket back plate and a first and a second center bracket side plates emerging perpendicular away from the center bracket back plate on opposite sides of the center bracket, the U-shaped center bracket shaped to partially surround the vertical support stub back plate and the two vertical support stub side plates and secure to the vertical support stub with a plurality of fasteners.

2. The swing-away spare tire carrier assembly for a motor vehicle of claim 1, wherein the U-shaped vertical support stub is welded to the horizontal arm.

3. The swing-away spare tire carrier assembly for a motor vehicle of claim 1, further comprising a reinforcing member attached to the vertical support stub and the horizontal arm.

4. The swing-away spare tire carrier assembly for a motor vehicle of claim 3 wherein:
   the vertical support stub further comprises a vertical support stub top plate affixed to the top of the vertical support stub back plate and the two vertical support stub side plates, and
   the reinforcing member is welded to the vertical stub top plate, the vertical support stub back plate, and the horizontal arm.

5. The swing-away spare tire carrier assembly for a motor vehicle of claim 1,
   wherein the U-shaped vertical support stub further comprises a vertical support stub bottom plate perpendicular to the vertical support stub back plate and to the two vertical support side plates; the vertical support horizontal bottom plate having a plurality of holes, the horizontal arm having a plurality of corresponding holes, wherein the vertical support stub bottom plate is configured to be bolted to the horizontal arm.

6. The swing-away spare tire carrier assembly for a motor vehicle of claim 1, wherein the U-shaped center bracket attached to the U-shaped vertical support stub forms a double wall.

7. The swing-away spare tire carrier assembly for a motor vehicle of claim 1, further comprising a first and a second diagonal lateral support brackets, the first diagonal lateral support bracket is coupled to the horizontal arm and to first center bracket side plate, the second diagonal lateral support bracket is coupled to the horizontal arm and to second center bracket side plate.

8. The swing-away spare tire carrier assembly for a motor vehicle of claim 1, wherein the swing-away tire carrier is an after-market product.

9. The swing-away spare tire carrier assembly for a motor vehicle of claim 1, wherein the U-shaped vertical stub is recessed with respect to front section of the horizontal arm.

10. A swing-away spare tire carrier assembly for a motor vehicle, comprising:
    a horizontal arm having a front section and first arm end pivotally configured to be connected to a bumper of a vehicle, the horizontal arm having a second arm end having a latching mechanism, the first arm end opposite to the second arm end;
    a U-shaped vertical support stub affixed to the horizontal arm, the vertical support stub having a vertical support stub back plate perpendicular to the length of the horizontal arm, two vertical support side plates emerging perpendicular away from the vertical support stub back plate, and a vertical support stub top plate affixed to the top of the vertical support stub back plate and the two vertical support stub side plates;
    a U-shaped reinforcing member having two side flanges, the reinforcing member secured within the channel of the U-shaped vertical support stub with the two side flanges secured to the vertical stub back plate, the reinforcing member extending vertically from the horizontal arm to the vertical support stub top plate; and,
    a U-shaped center bracket, the center bracket having a center bracket back plate and a first and a second center bracket side plates emerging perpendicular away from the center bracket back plate on opposite sides of the center bracket, the U-shaped center bracket shaped to surround the vertical support stub back plate and the two vertical support stub side plates and secure to the vertical support stub with a plurality of fasteners.

11. The swing-away spare tire carrier assembly for a motor vehicle of claim 10, wherein:
    the bottom end of vertical support stub is welded to the horizontal arm,
    the reinforcing member is welded to the horizontal arm, to the vertical support back plate, and to the vertical support top plate.

12. The swing-away spare tire carrier assembly for a motor vehicle of claim 10, wherein the U-shaped center bracket attached to the U-shaped vertical support stub forms a double wall.

13. The swing-away spare tire carrier assembly for a motor vehicle of claim 10, further comprising a first and a second diagonal lateral support brackets, the first diagonal lateral support bracket is coupled to the horizontal arm and to first center bracket side plate, the second diagonal lateral support bracket is coupled to the horizontal arm and to second center bracket side plate.

14. The swing-away spare tire carrier assembly for a motor vehicle of claim 10, wherein the swing-away tire carrier is an after-market product.

15. The swing-away spare tire carrier assembly for a motor vehicle of claim 10, wherein the U-shaped vertical support stub is recessed with respect to front section of the horizontal arm.

16. A swing-away spare tire carrier system for a motor vehicle, comprising:
    a bumper configured to attach to a motor vehicle, the bumper having a bumper pin protruding vertically from the bumper first end of the bumper, the bumper having a latching bracket on the second end of the bumper, the first end of the bumper opposite the second end of the bumper;
    a horizontal arm having a front section and first arm end pivotally configured to the bumper pin of the bumper, the horizontal arm having a second arm end having a latching mechanism, the first arm end opposite to the second arm end;
    a U-shaped vertical support stub affixed to the horizontal arm, the vertical support stub having a vertical support stub back plate perpendicular to the length of the horizontal arm and two vertical support side plates emerging perpendicular away from the vertical support stub back plate, the vertical support stub having a plurality stub through-holes; and,
    a U-shaped center bracket, the center bracket having a center bracket back plate and a first and a second center bracket side plates emerging perpendicular away from the center bracket back plate on opposite sides of the center bracket, the U-shaped center bracket shaped to surround the vertical support stub back plate and the two vertical support stub side plates and secure to the vertical support stub with a plurality of fasteners.

17. The swing-away spare tire carrier system for a motor vehicle of claim 16, wherein the U-shaped vertical support stub is welded to the horizontal arm.

18. The swing-away spare tire carrier system for a motor vehicle of claim 16, further comprising a reinforcing member attached to the vertical support stub and the horizontal arm.

19. The swing-away spare tire carrier system for a motor vehicle of claim 18 wherein:

the vertical support stub further comprises a vertical stub top plate affixed to the top of the vertical support stub back plate and the two vertical support stub side plates, and the reinforcing member is welded to the vertical stub top plate, the vertical stub back plate, and the horizontal arm.

20. The swing-away spare tire carrier system for a motor vehicle of claim 16, wherein the U-shaped vertical support stub further comprises a vertical support stub bottom plate perpendicular to the vertical support stub back plate and to the two vertical support side plates; the vertical support horizontal bottom plate having a plurality of holes, the horizontal arm having a plurality of corresponding holes, wherein the stub bottom plate is configured to be bolted to the horizontal arm.

* * * * *